United States Patent [19]

Anglin et al.

[11] 4,102,516
[45] Jul. 25, 1978

[54] TENSIONING MEANS FOR BELT DRIVEN TAPE CASSETTE

[75] Inventors: Noah L. Anglin; Robert H. Berry, both of San Jose, Calif.

[73] Assignee: Information Terminals Corporation, Sunnyvale, Calif.

[21] Appl. No.: 787,389

[22] Filed: Apr. 14, 1977

[51] Int. Cl.² .................. G03B 1/04; G11B 15/32; G11B 23/04
[52] U.S. Cl. ................................ 242/199; 242/192; 360/132
[58] Field of Search .................. 242/192–200, 242/76; 352/72–78 R; 360/96, 132

[56] References Cited

U.S. PATENT DOCUMENTS

| | | | |
|---|---|---|---|
| 2,743,878 | 5/1956 | Masterson | 242/192 |
| 3,114,512 | 12/1963 | Peshel et al. | 242/192 |
| 3,348,786 | 10/1967 | Miller et al. | 242/200 |
| 3,891,159 | 6/1975 | Nelson | 242/199 |

FOREIGN PATENT DOCUMENTS 751,075  12/1952  Fed. Rep. of Germany ....... 242/192

*Primary Examiner*—Leonard D. Christian
*Attorney, Agent, or Firm*—Lindenberg, Freilich, Hornbaker, Wasserman, Rosen & Fernandez

[57] ABSTRACT

In a tape cartridge of the type wherein a motor-driven endless belt bears against the supply and take-up rolls of tape to move the tape, and wherein the belt extends about a pair of guide rollers that hold it in tension, the improvement of a drag washer for applying drag to the guide rollers to assure tension in the belt. Each drag washer is bowed, with a central portion having a hole receiving the roller shaft and bearing against an end of the roller, and with a pair of arms bearing against the cartridge frame.

5 Claims, 3 Drawing Figures

U.S. Patent  July 25, 1978  4,102,516
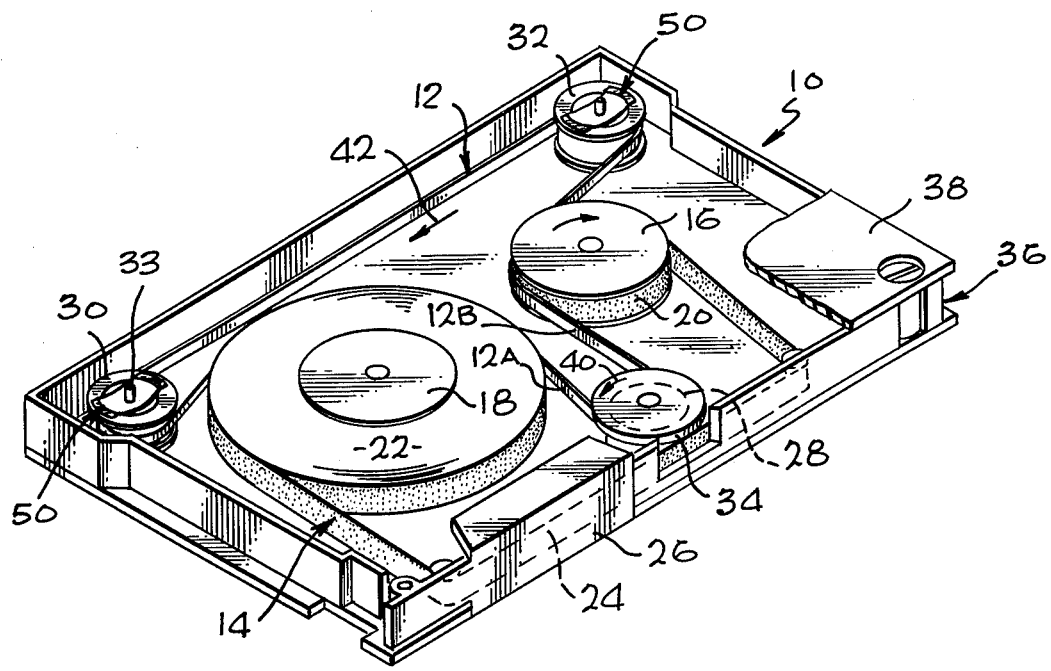
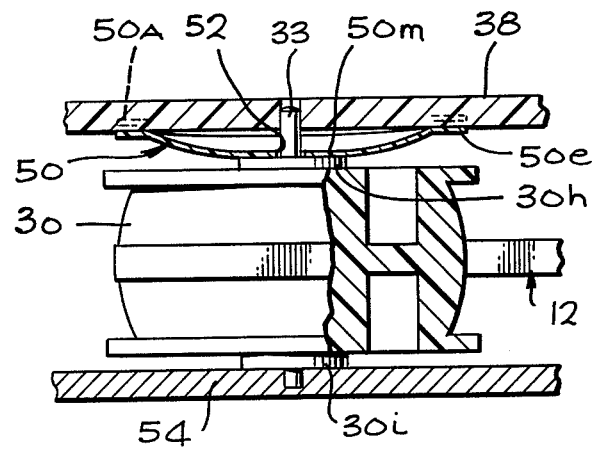

TENSIONING MEANS FOR BELT DRIVEN TAPE CASSETTE

BACKGROUND OF THE INVENTION

One type of tape cartridge utilizes a belt that presses against the supply and take-up rolls of tape to move the tape from one roll, past a read/write assembly, and onto the other roll. The belt can be guided by a pair of corner guide rollers, and a driven pulley can move the belt along its path. The tape is maintained in tension by applying drag to the drive belt. This drag causes slight elongation of one portion of the belt, so that it tends to turn the take-up roll of tape with a slightly greater peripheral speed than the other roll of tape, to thereby produce tension in the tape.

Various schemes have been proposed for producing tension in the drive belt of a belt-driven tape cartridge. For example, U.S. Pat. No. 3,620,473 shows a friction brake shoe across which a belt must pass, to apply drag to the belt. However, the use of sliding friction against the belt can cause wear on the belt. U.S. Pat. No. 3,692,255 describes guide rollers rotating on shafts, wherein the guide rollers and shafts are constructed of materials which produce a predetermined amount of friction. However, it is difficult to obtain sufficiently high friction between a roller and its shaft while still assuring smooth rolling of the roller. This is partly because it is normally desirable to utilize polished steel shafts, which have low friction with respect to the hard plastic materials that may be utilized in constructing injection-molded rollers.

SUMMARY OF THE INVENTION

In accordance with one embodiment of the present invention, a tape cartridge is provided which maintains a controlled tape tension in a simple and reliable manner. Drag is applied to each guide roller which guides the belt drive of the cartridge, by use of a bowed washer which has a middle portion bearing against the hub of the guide roller, and which has opposite ends forming legs biased against the housing of the cartridge. Slippage of the washer can be avoided by constructing the washer, guide roller, and housing of selected materials, so that there is a higher coefficient of friction of the washer material on the guide roller, than the housing material on the guide roller.

The novel features that are considered characteristic of this invention are set forth with particularitly in the appended claims. The invention will be best understood from the following description when read in connection with the accompanying drawings.

BRIEF DESCRIPTION OF THE DRAWINGS

FIG. 1 is a perspective view of a belt-driven cassette constructed in accordance with one embodiment of the invention, shown with the top wall of the housing partially cut away;

FIG. 2 is a plan view of one of the guide rollers of the cassette of FIG. 1; and FIG. 3 is a view taken on the line 3—3 of FIG. 2, but also showing the top wall of the cartridge.

DESCRIPTION OF THE PREFERRED EMBODIMENT

FIG. 1 illustrates a tape cartridge or cassette 10, of the belt-driven type which utilizes a belt 12 to move the magnetic recording tape 14 between a pair of reels 16, 18. Each reel holds a roll of tape 20, 22, and the tape is moved from one reel past a read/write station 24 where a cover 26 can be opened to permit a read/write head assembly (not shown) to bear against the tape. The belt 12 which drives the tape, bears against the two tape rolls 20, 22 and extends around a drive roller 28 and a pair of guide rollers 30, 32. When a driven roller 34, which is fixed to the drive roller 28, is rotated, the belt 12 is moved to thereby rotate the tape rolls and move tape from one reel to the other. The mechanism is contained in a housing 36 which includes a top wall 38 shown cut away in FIG. 1.

Test programs have established that tape tension at the read/write station 24 must be maintained within certain limits to avoid loss of data in reading or writing on the tape. In one type of quarter inch cartridge, mathematical analysis has shown that the tape tension should be between one and three ounces. Such tension can be established by maintaining drag on the drive belt 12. The way that drag on the belt 12 causes tension in the tape, can be understood by assuming that the driven roll 34 is moving in the direction of arrow 40 so that the belt is moving in the direction of arrow 42. If there is drag on the belt, then the belt portion 12A which is moving into the drive roller 28, is under higher tension then the belt portion 12B which is leaving the drive roller. The belt 12 is constructed of elastic material so that the belt portion 12A will be stretched slightly more than the belt portion 12B. The slightly greater stretching of belt portion 12A causes it to try to move the periphery of the take-up tape roll 22, slightly faster than the periphery of the supply tape roll 20, resulting in tension in the tape.

The maintenance of a predetermined level of drag on the drive belt 12 can be accomplished by applying drag to either or both of the guide rollers 30, 32. There is some drag resulting from friction between each roller such as roller 30 and its shaft 33 (FIG. 3), but it is difficult to increase this friction to a closely controlled higher level in a simple and economical manner.

In accordance with the present invention, a drag washer 50 is provided at each guide roller 30, 32 to provide a small but controlled drag to the roller to thereby provide drag to the drive belt 12. Each drag washer 50 is formed of a sheet of material such as nylon plastic, and tends to assume the configuration illustrated at 50A (FIG. 3) when uncompressed. In either its undeformed or deformed configuration, the washer has a bowed shape, with a pair of straight ends 50e. When the washer is installed, its middle portion 50m presses against one end of the hub portion 30h of the roller. Thus, as the roller turns, the middle portion 50m of the washer and the end surface of the hub portion 30h are in frictional contact, so the washer applies a small amount of drag to the roller.

In one cartridge, the roller 30 is constructed of acetyl plastic, while the top wall 38 is constructed of a polycarbonate plastic. Nylon, of which the washer 50 is constructed, has a higher coefficient of friction on the polycarbonate material of the top wall 38, than on the acetyl material of the washer 30. This, in addition to the fact that the ends 50e of the washer are further from the axis of the roller than the middle portion 50m which bears against the roller, results in the washer being held stably in position. Even when the tape suddenly starts and stops, the washer tends to remain in position rather than rotating with the roller 30. The washer is held centered over the roller by the fact that the shaft 33 which holds the roller, also projects through a hole 52 in the center of the washer. The biasing of the washer against the roller 30 also results in the opposite end 30*i* of the hub portion pressing against the bottom wall 54 (which is constructed of aluminum) of the cartridge housing, to increase the drag on the roller.

The washers 50 can be constructed at low cost from sheets of plastic, by cutting the washers from the sheet and deforming them with heat to the bowed shape (the deforming can be accomplished prior to cutting). The amount of bowing of the washer controls the amount of drag. The rollers, housing of the cartridge, and washers, are constructed to relatively close tolerances, so that the amount of drag applied by the washers is substantially uniform for all cartridges.

Thus, the invention provides a tape cartridge of the belt-driven type, wherein a small but controlled drag is applied to the belt guide rollers in a simple and reliable manner. This is accomplished by the use of a washer disposed between an end of at least one roller and the cartridge housing, and which is partially compressed between them, for applying drag to the roller. The washer is of a bowed configuration, with a middle portion pressing against the roller and with outer ends pressing against the housing to prevent free rotation of the washer. In addition, the roller, washer, and housing are constructed of materials which provide a higher coefficient of friction between the housing and washer than between the roller and washer.

Although particular embodiments of the invention have been described and illustrated herein, it is recognized that modifications and equivalents may readily occur to those skilled in the art and consequently it is intended that the claims be interpreted to cover such modifications and equivalents.

What is claimed is:

1. Apparatus for maintaining tape tension in a belt driven cartridge of the type which includes a cartridge housing, a pair of reels for holding rolls of magnetic tape, said reels rotatably mounted on the housing, and an endless belt extending partially about the rolls of tape on the two reels, about a drive roller, and about a pair of corner belt rollers, each corner belt roller being rotatably supported on a corner roller shaft, comprising:

a bowed washer having a middle portion with a hole receiving a corner roller shaft, a pair of washer end portions bearing against a portion of said housing, and a middle washer portion bearing against said corner belt roller, whereby to apply a small but definite drag to the corner belt roller.

2. The improvement described in claim 1 wherein:

said cartridge housing portion is constructed of a material of higher coefficient of friction on the washer material than the coefficient of friction of the washer material on the corner belt roller material, whereby to more reliably avoid movement of the washer.

3. The improvement described in claim 2 wherein:

said washer is formed of an acetyl plastic, said housing portion is formed of a polycarbonate plastic, and said corner belt roller is formed of a nylon plastic.

4. In a belt driven magnetic tape cartridge which includes a housing, a pair of tape rolls rotatable with respect to said housing, and a driven belt bearing against the rolls of tape to move the tape, the improvement comprising:

a belt guide roller shaft disposed near the path of said belt and having opposite shaft ends held by said housing;

a belt guide roller having a hub portion mounted on said shaft and having a peripheral portion engaged with said belt to guide it; and a resilient bowed washer having a hole which receives said shaft, said washer being partially compressed between said housing and an end of said belt roller, whereby to retard said belt roller to produce tension in said tape.

5. The improvement described in claim 4 wherein:

said washer has a bowed middle portion bearing against the hub portion of said roller, and has substantially flat opposite end portions bearing against said housing.

* * * * *